(12) United States Patent
Cho

(10) Patent No.: US 6,487,318 B1
(45) Date of Patent: Nov. 26, 2002

(54) METHOD OF RELOCATING WAVELET PACKET COEFFICIENT

(75) Inventor: Hyun Duk Cho, Songnam-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/224,901

(22) Filed: Dec. 31, 1998

(30) Foreign Application Priority Data

Dec. 22, 1998 (KR) ............................................. 98-57182

(51) Int. Cl.⁷ .............................. G06K 9/36; H04N 7/12

(52) U.S. Cl. ................................... 382/240; 375/240.11

(58) Field of Search .................................. 382/240, 232, 382/233, 246, 248; 348/403.1; 375/240.11, 240.18

(56) References Cited

U.S. PATENT DOCUMENTS

| | | | | |
|---|---|---|---|---|
| 5,724,451 A | * | 3/1998 | Shin et al. | 382/240 |
| 5,825,935 A | * | 10/1998 | Murakoshi | 382/248 |
| 6,157,746 A | * | 12/2000 | Sodagar et al. | 382/240 |
| 6,393,060 B1 | * | 5/2002 | Jeong | 375/240.19 |

OTHER PUBLICATIONS

Antonini, et al., "Image Coding Using Wavelet Transform," 1992 IEEE, pp. 205–220.
Ramchandran, et al., "Best Wavelet Packet Bases in a Rate–Distortion Sense," 1993 IEEE, pp 160–175.
Said, et al., "A New, Fast, And Efficient Image Codec Based on Set Partitioning in Hierarchical Trees," 1996 IEEE, pp. 243–250.
Shapiro, Jerome M., "Embedded Image Coding Using Zerotrees of Wavelet Coefficients," 1993 IEEE, pp. 3445–3462.

* cited by examiner

*Primary Examiner*—Wenpeng Chen
(74) *Attorney, Agent, or Firm*—McKenna Long & Aldridge LLP

(57) ABSTRACT

The present invention is related to a image compression and transmission method, and particularly to a method of relocating a wavelet packet coefficient for a zerotree coding in order to optimize an encoder to be suitable for transmitting image off-line. To realizing the present invention, for the wavelet packet coefficients, located on frequency bands which are divided in several subbands according to frequency of an image data thereon, the present invention collects coefficients in same location on each of the subbands, and relocates the collected coefficients in a same location in an integrated frequency band, formed by integrating the subbands.

20 Claims, 6 Drawing Sheets

WAVELET PACKET
TRANSFORM IMAGE

WAVELET PACKET LOCATION  RELOCATED LOCATION

WAVELET PACKET LOCATION → RELOCATED LOCATION

METHOD OF RELOCATING WAVELET PACKET COEFFICIENT

BACKGROUND OF THE INVENTION

1. Technical field

The present invention relates to an image compression and transmission method, and particularly to a method of relocating a wavelet packet coefficient for a zerotree coding in order to optimize an encoder to be suitable for transmitting image off-line.

2. Description of the Prior Art

This invention is incorporated by the reference, "Image coding using wavelet transform", IEEE Trans. Image Processing, vol.1, pp.205–220, April 1992, by M.Antonini, M.Barlaoud, P.Mathieu, and I.Daubechies; "Embedded image coding using zerotree of wavelets coefficients", IEEE Trans. Signal Processing, vol.41, pp.3445–3462, December 1993, by J. M. Sharpiro; "A new fast and efficient image coding based on set partitioning in hierarchical trees", IEEE Trans. Circuits Syst. Video Technol. vol.6, pp.243–250, June 1996, A.Said and W. A. Pearlman; "Best wavelet packet bases in a rate-distortion sense", IEEE Trans. Image Processing, vol.2, pp.160–175, April 1993, by K.Ramchandran and M.Vetterli.

FIG. 1 shows a conventional image compression and transmission method. As shown in the figure, the conventional image compression and transmission method executes a wavelet transform process 10 for dividing image data into several frequency bands, so as to allow most energy to be focused on a few coefficients on the band. Then, the image data is compressed by executing a zerotree coding process 20 of coding the wavelet coefficients by forming a tree structure with the wavelet coefficients.

The image transformed by the wavelet transform process 10 is divided into several frequency bands, as shown in FIG. 2. In the figure, it is indicated that a left and upper portion of the frequency band corresponds to a low frequency band and a right and lower portion also corresponds to a higher frequency band. Therefore, a smallest band, positioned leftmost and uppermost in the frequency band, shows a lowest frequency. Also a largest band, positioned rightmost and lowermost, shows a highest frequency. At this time, because most of the image data energy flock to the low frequency bands, most of the image data can be represented by using only the small frequency bands (low frequency bands). That is, because the energy gathers in a few coefficients, the image data can be compressed by coding only the coefficients.

As shown in FIG. 3, in the zerotree coding process 20, the wavelet transformed coefficients are assembled in a tree structure. In the tree structure, a coefficient in a top position is called "patent", and coefficients just under the top coefficient, or the parent, are named as "child". And all coefficients, including the child, under the parent can be commonly designated as "descendant".

Now, an operation of the above prior art is explained below.

In the wavelet transform process 10, at first, the image is transformed in order to express with a few coefficients in the frequency band. Then in the zerotree coding process 20, the wavelet coefficients are assembled into the tree structure, and a zerotree coding is executed, based on a specific threshold, so as to compress image.

For accomplishing the wavelet transform process 10, a filtering and subsampling is used. The image data can be divided into a low frequency band and a high frequency band by a low frequency filtering and subsampling and a high frequency filtering and subsampling. At this time, because the low frequency band has room to be compressed, the filtering and subsampling is repeated to the low frequency band. As a result, the wavelet transformed image having several frequency bands as shown in FIG. 2 can be obtained.

Then, the zerotree coding is carried out about the wavelet transformed image. In the zerotree coding process, when a magnitude of a coefficient is smaller than a threshold T, the coefficient is defined as "zero" or "insignificant coefficient", while, when a magnitude of a coefficient is bigger than the threshold T, the coefficient is defined as "non-zero", or "significant coefficient". In case of the non-zero, the coefficient value is transmitted after executing quantization about the non-zero coefficient. However, in case of the coefficient defined in zero, the coefficient is defined as a "Zerotree Root" symbol when all of the children is zero. In the zero coefficient case, however, when there is non-zero child, the coefficient is defined as a "Isolated Zero" symbol. Then, the wavelet coefficients in the tree structure are scanned and transmitted from parent to child and from left to right in FIG. 3. The wavelet coefficient of image data commonly has strong correlation with a position on a picture. So, when the parent coefficient is zero, the descendant coefficients are much probable to be zero. Therefore, defining that the all zero descendant coefficients as well as the zero parent coefficient are one symbol, that is, a zerotree root, it is permissible not to transmit coefficient values of the descendants in the zerotree root symbol, which gives a high compression effect.

Whole operation of the zerotree coding is accomplished as below. At first, after quantizing all the coefficients on Zerotree on the basis of the initial threshold T, the encoder transmits quantized values of the non-zero coefficients, the isolated zero symbols and the zerotree root symbols. At second, after quantizing all the coefficients on Zerotree on the basis of the second threshold T/2, the encoder transmits secondly calculated quantized values of the non-zero coefficients, the isolated zero symbols and the zerotree root symbols. Then, after repeating the above process successively, when it reaches a required bit rate, the coding is completed.

A decoder performs a reverse operation to the encoder for acquiring a reconstructed image.

It may be understood that the above zerotree coding is designed to be suitable for the wavelet transformed coefficient. As shown in FIG. 2, it is difficult that the tree structure for the zerotree coding is assembled in other form except the wavelet transform.

However, the zerotree coding can not be applied to a wavelet packet transform, which is generalized from the wavelet transform, and provides better performance than the wavelet transform in many kinds of image data. Therefore, there is need for an image compression and transmission technique for applying the zerotree coding to the wavelet packet coefficients.

SUMMARY OF THE INVENTION

Therefore, the present invention is designed to overcome the above problems. An object of the invention is to provide a method of relocating wavelet packet coefficients for a zerotree coding. The zerotree coding of the wave packet coefficients can be effectively accomplished by a method which is as follows; collecting coefficients at the same position of different frequency subbands and relocating them at the same position of integrating frequency band.

In order to accomplish the above object, the present invention provides a method for relocating wavelet packet coefficients from frequency subbands into the frequency band integrating the frequency subbands, comprising the steps of collecting coefficients in same locations of the subbands, and relocating the collected coefficients in a corresponding location in an integrating frequency band, formed by integrating the subbands.

Additionally, in another embodiment, the present invention provides a method for relocating wavelet packet coefficients comprising a wavelet packet transform process for executing a filtering and subsampling of image data and transforming the image data into wavelet packet coefficients having various frequency bands; and a coefficient relocating process for collecting coefficients corresponding to same locations on frequency subbands among the wavelet packet transformed coefficients, and relocating the coefficients in a corresponding location on an integrated frequency band so as to assemble a tree structure for a zerotree coding.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DETAILED DESCRIPTION OF THE PREFERRED EMBODIMENT

Hereinafter, a method of relocating wavelet packet coefficients according to each embodiment of the present invention is described in reference to the accompanying drawings.

Figure 1:
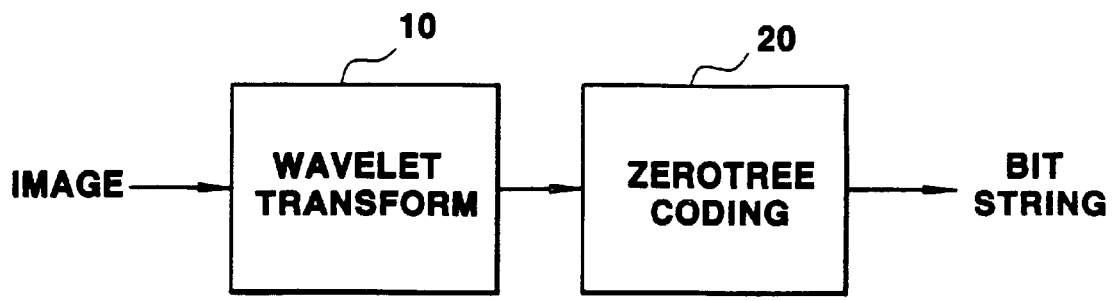
FIG. 1 is a block diagram showing a conventional image compression process.
Figure 2:
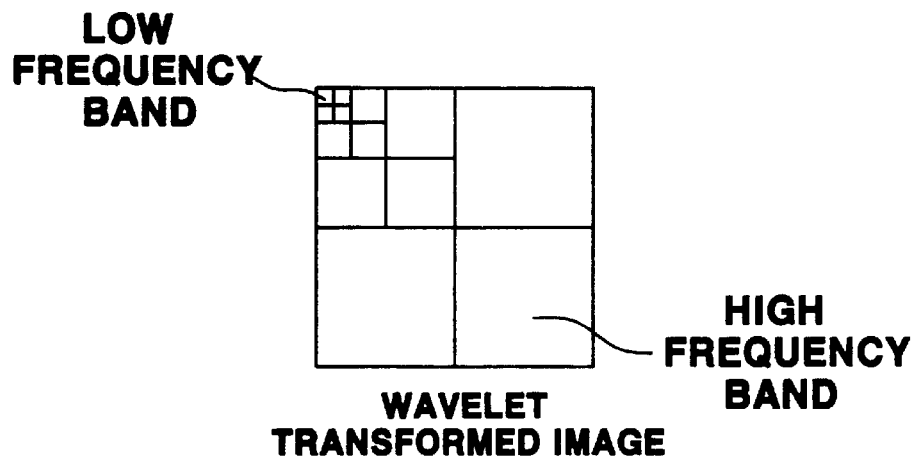
FIG. 2 exemplary shows an image after a wavelet transform process in FIG. 1.
Figure 3:
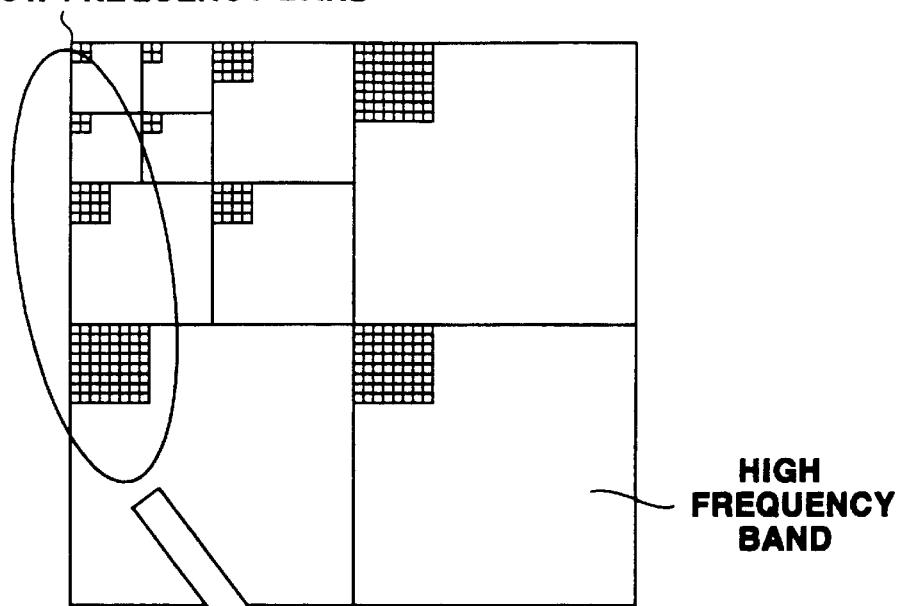
FIG. 3 exemplary shows wavelet transformed coefficients and a tree structure in FIG. 1.
Figure 3:
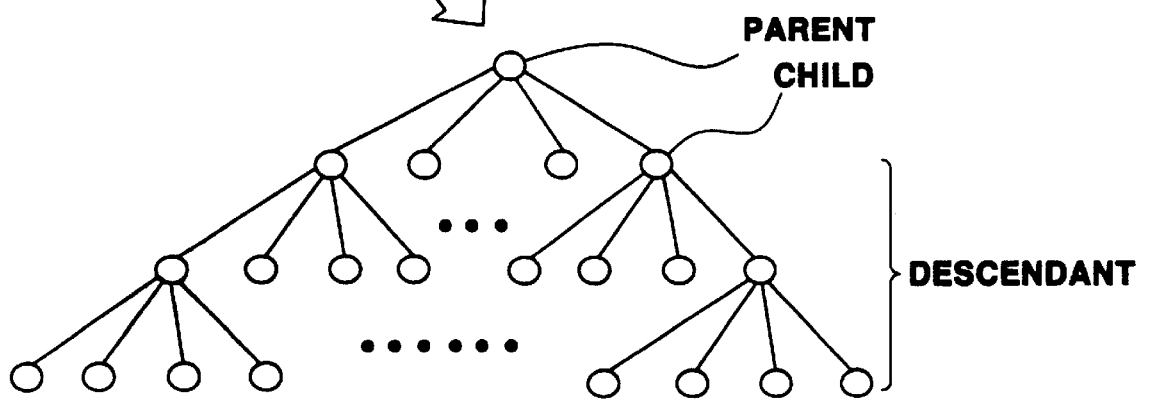
Figure 4:
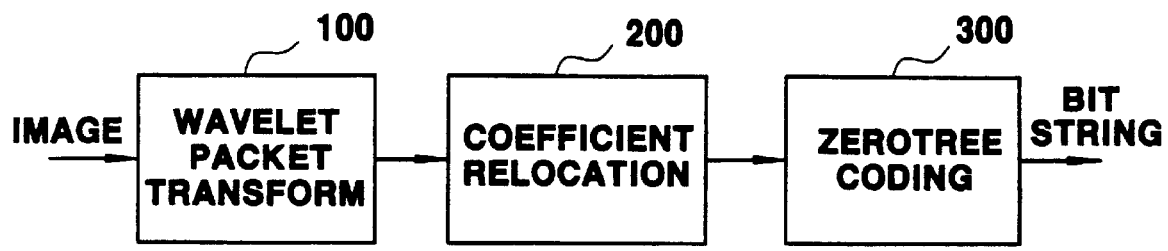
FIG. 4 is a block diagram showing an image compression process according to the present invention.

FIG. 4 is a block diagram for illustrating an image compression process according to the present invention.

As shown in the figure, the image compression process can includes a wavelet transform process 100 for filtering and subsampling the image data, and then transforming the image data into wavelet packet coefficients having several frequency bands. The image compression process then executes a coefficient relocating process 200 for collecting, among the wavelet packet transformed coefficients, coefficients corresponding to same location of frequency bands (subbands), and relocating them in same location on a frequency band, in which the subbands are integrated. Then a zerotree coding process 300 is executed for coding the wavelet packet coefficients by assembling the wavelet packet coefficients, relocated on the same location on the frequency band, into a tree structure.

Figure 5:
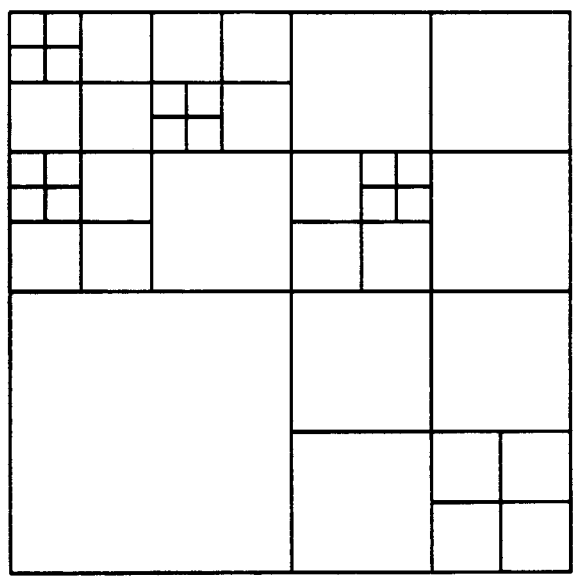
FIG. 5 exemplary shows a wavelet transformed image in FIG. 4.

FIG. 5 exemplary shows an image transformed by the wavelet packet transmission process 100.

As shown in the figure, as the frequency band is lower, the size of the frequency band does not become smaller, unlike the wavelet coefficient. Therefore, it would be comprehended that the size of the frequency band can be any shape, not limited to the level of the frequency.

Therefore, because the tree structure for the zerotree coding cannot be assembled, the location of the coefficients on the frequency bands are relocated for efficiently accomplishing the zerotree coding in the present invention.

Figure 6A:
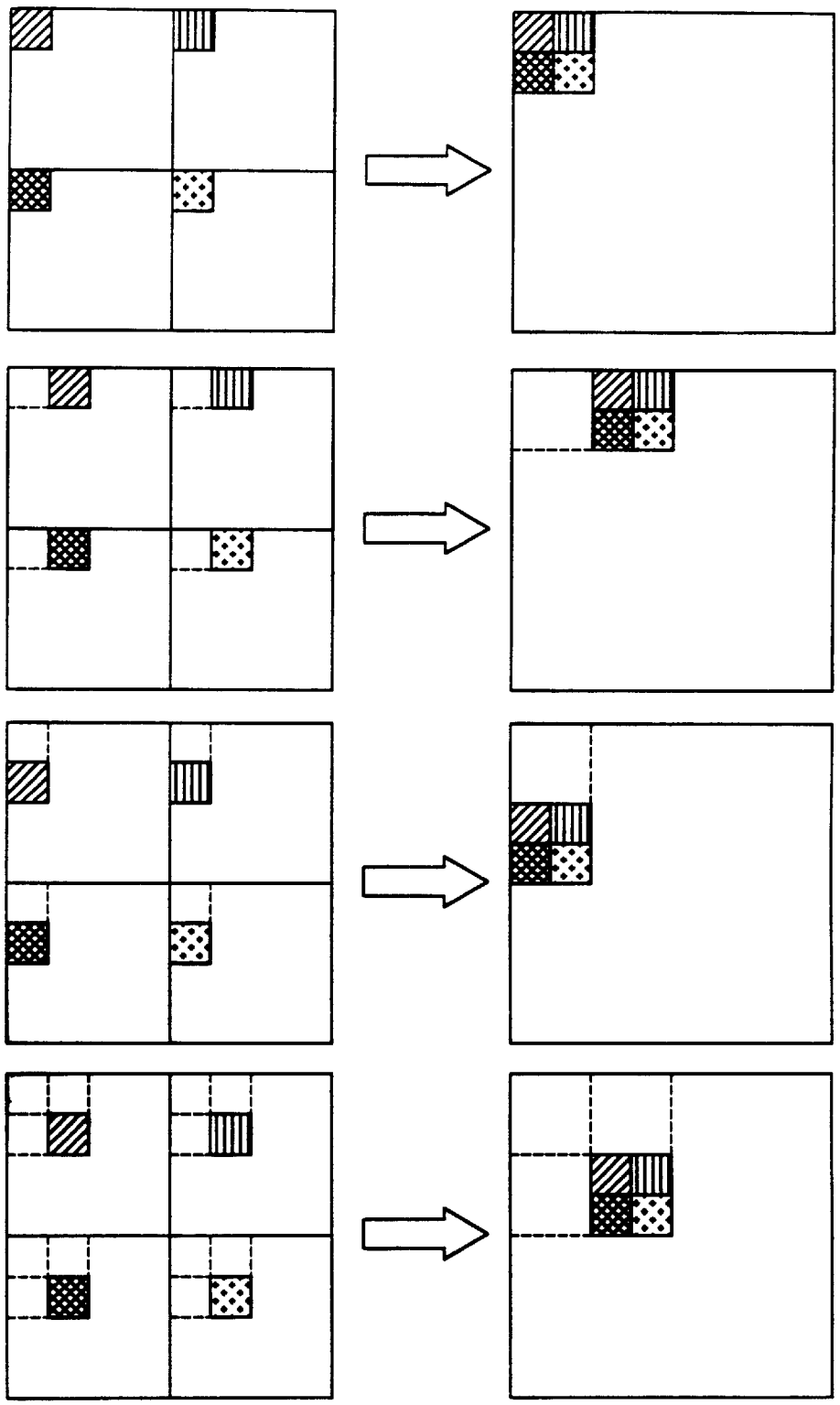
FIGS. 6A and 6B show one embodiment illustrating a relocating process of wavelet packet coefficients in FIG. 4.
Figure 6B:
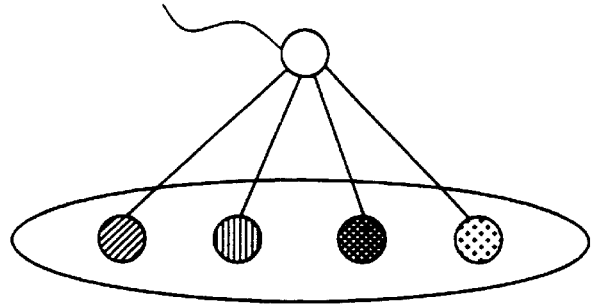

FIG. 6a shows a wavelet packet region and a relocated wavelet packet region on the frequency band for illustrating one embodiment of the wavelet packet coefficient relocating process. And, FIG. 6b shows a coefficient distribution of each band in the tree structure, assembled for executing the zerotree coding.

As shown in the figure, in the one embodiment of the coefficient relocating process, each of the wavelet packet coefficients corresponds to same locations in subbands, at first. The subbands can have different frequencies, as described above. The wavelet packet coefficients are then relocated to lie adjacent each other in a location in the integrated frequency band corresponding to the locations in the subbands. Therefore, the coefficients in the corresponding location in the subband can be distributed as a child under a coefficient of the low-frequency band on a high level of the tree structure, or parent.

Figure 7A:
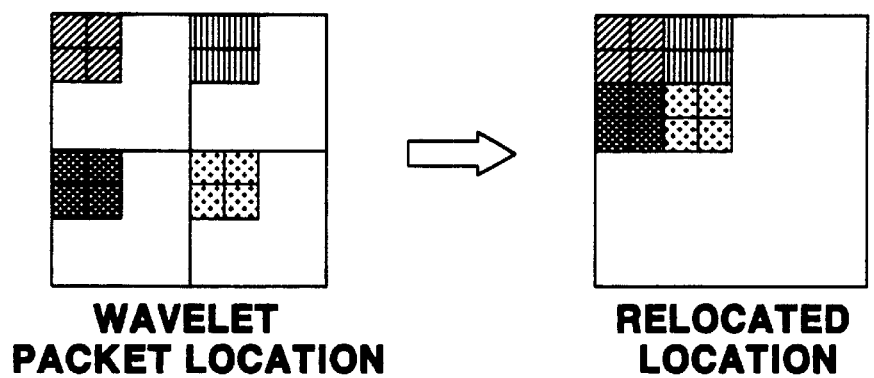
FIGS. 7A and 7B show another embodiment illustrating the relocating process of wavelet packet coefficients in FIG. 4.
Figure 7B:
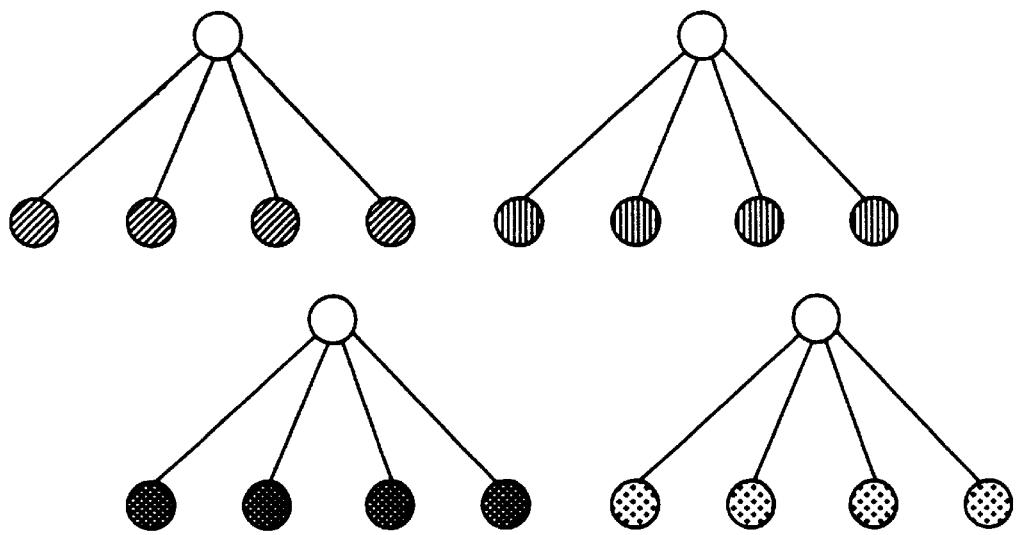

FIG. 7a shows a wavelet packet region and a relocated wavelet packet region on the frequency band for illustrating another embodiment of the wavelet packet coefficient relocating process. And, FIG. 7b shows a coefficient distribution of each band in the tree structure, assembled for executing the zerotree coding according to the another embodiment.

As shown in FIG. 7a, in the another embodiment of the coefficient relocating process, adjacent four wavelet packet coefficients in the subbands having same frequency are defined as one unit. Similar to FIG. 6a, the units corresponding to same locations in the subbands can have different frequencies. The units are then relocated to lie adjacent each other in the integrated frequency band. Therefore, in the tree structure as shown in FIG. 7b, coefficients of one of the subbands can be distributed as a child under a coefficient of each upper low-frequency band (namely, one parent).

As more wavelet coefficients collects at a specific frequency band, the above unit relocating method is more effective. In addition, according to characteristics of the image data, the relocating method can relocate 8, 16, 32 wavelet coefficients in a unit.

Figure 8:
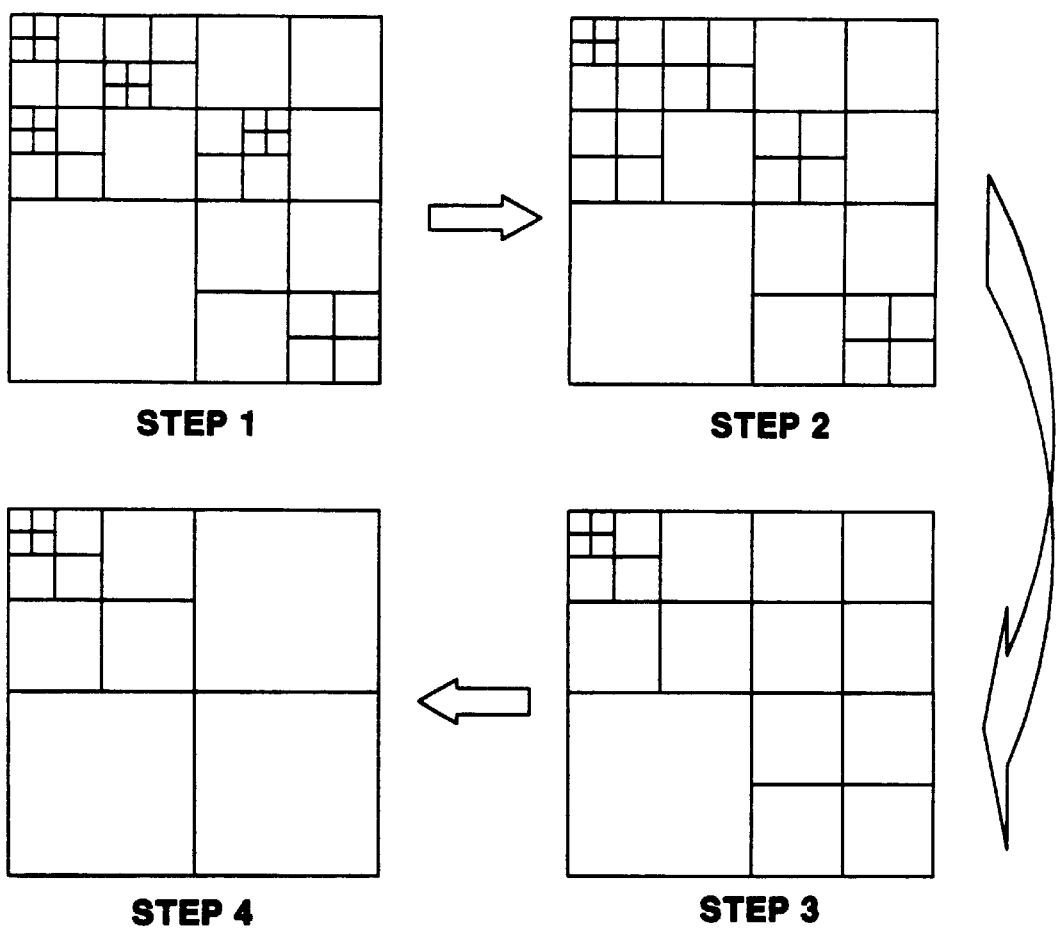
FIG. 8 shows a process that the wavelet packet transformed image converts to a final relocated image according to the present invention.

FIG. 8 shows a process that the wavelet packet image transforms into a final relocated image. Referring to the figure, it would be understood that the coefficient relocating process is repeatedly executed until each subband becomes a wavelet coefficient.

In the relocating process from the step 1 to the step 2, four smallest subbands are selected on the frequency band. The four smallest subbands are virtually integrated in one bigger band. In the relocating process from the step 2 to the step 3, the bigger band, integrated in the step 2, and other adjacent bands, having same size as the bigger band, are relocated and integrated again into one much bigger band. In the relocating process from the step 3 to the step 4, the much bigger band, integrated in the step 3, and other adjacent bands, having same size as the much bigger band, are relocated and integrated again in one biggest band. The step 4 shows a desired final structure same as the wavelet transformed coefficient.

After the steps 1 to 4, the zerotree coding is executed in the same conventional manner.

Operation and effect of the present invention as constructed above, are described as follows.

The wavelet packet transform process 100, which is the first step of the present invention, is accomplished by one of a top-down transform and a bottom-up transform.

The top-down transform is a method of executing the filtering and the subsampling, and further dividing the band when determined that the compression for the high frequency band is effective after the wavelet transform. On the other hand, the bottom-up transform is a method of integrating the divided bands by executing the filtering and an up-sampling (or, reverse wavelet transform). The bottom-up transform is required when it is determined that the compression is effective after repeatedly executing the filtering and subsampling for the frequency bands until a predetermined level. Though the wavelet packet transform process is accomplished by one of the methods, the zerotree coding cannot be executed directly because the frequency bands do not have regular sizes.

Therefore, in order to accomplish the zerotree coding for the wavelet packet transformed coefficients, the wavelet packet coefficients should be relocated as shown in FIG. 6a. The coefficient relocating process 200 gives same effect as integrating the divided frequency bands without executing the reverse wavelet transform. Each of the wavelet packet coefficients has a location information of a before-transform image. Therefore, when relocating the wavelet packet coefficients, coefficients corresponding to same location in each frequency band are collected and located in a corresponding location in the integrated band.

When executing the zerotree coding about the wavelet packet coefficients, relocated as shown in FIG. 6a, each of the trees is constructed with coefficients in different frequency bands. As a result, when collecting and relocating the four coefficients in a unit in FIG. 7a, the last branches of each tree is consisted of coefficients from the same band as shown in FIG. 7b. Therefore, coding performance is enhanced more than the relocating process in FIG. 6a. The unit relocating method will be more effective when the wavelet coefficient has strong correlation with the frequency. Furthermore, by using the unit relocating method, 8, 16, 32 wavelet coefficients can be relocated in a unit, depending on the respective image data characteristics.

Whole coefficient relocating method is accomplished by repeatedly executing the relocating process in FIG. 6a or FIG. 7a from small bands by using the above described method. After searching and relocating smallest bands, four smallest bands are virtually integrated in one bigger band. Then, the integrated bigger band and other adjacent bands having same size as the bigger band are relocated and integrated again. That process is repeated until the wave packet coefficients are to have same configuration as the wavelet packet transformed coefficients.

After the coefficient relocating process, the zerotree coding is accomplished in same manner as the wavelet transform.

The decoder passes by reverse processes against the above process for obtaining a recovered image.

Because the zerotree coding is applied to the wavelet packet transform, which is more generalized type than the wavelet transform, the present invention as described above can raise image quality at the same bit rate more than the prior art. In addition, the present can decrease amount of the data in case of having equal image quality. Furthermore, the present invention has an advantage of providing the highest image quality in the off-line coding applications such as an on-demand video service, an image service in Web, or an image storing and recovering device for a medical usage.

What is claimed is:

1. A method for relocating wavelet packet coefficients, comprising the steps of:
    (a) transforming image data into the wavelet packet coefficients, the wavelet packet coefficients being located on a frequency band divided into frequency subbands depending upon frequency components;
    (b) collecting the wavelet packet coefficients in same locations of each frequency subbands that are in a frequency band, called pseudo-subband, covering a certain range of frequency; and
    (c) relocating the collected wavelet packet coefficients on the pseudo-subband.

2. The method as claimed in claim 1, wherein the wavelet packet coefficients corresponding to the same locations of each frequency subband are children of a coefficient in a parent frequency band in a tree structure when the relocated wavelet packet coefficients are assembled in the tree structure.

3. The method as claimed in claim 1, wherein said step (c) includes the step of relocating the wavelet packet coefficients by assembling a specific number of the wavelet packet coefficients as a unit.

4. The method as claimed in claim 3, wherein the specific number is 4.

5. The method as claimed in claim 3, wherein the specific number of the wavelet packet coefficients changes according to a characteristic of the image data.

6. The method as claimed in claim 5, wherein the characteristic of the image data is a correlation either between the wavelet packet coefficients and their locations, or, between the wavelet packet coefficients and their frequencies.

7. The method as claimed in claim 3, wherein, in a portion of a tree structure, a parent coefficient has wavelet packet coefficients corresponding to a same location as children when the relocated wavelet packet coefficients are assembled in the tree structure.

8. The method as claimed in claim 7, wherein the portion of the tree structure is branches in a lowest level of the tree structure.

9. The method as claimed in claim 1, wherein four frequency subbands are integrated into one frequency band when the collected wavelet packet coefficients are relocated.

10. The method as claimed in claim 9, wherein the one frequency band is integrated with another frequency band adjacent to the one frequency band when the collected wavelet packet coefficients are relocated.

11. The method as claimed in claim 10, wherein such integration is repeated until a frequency band structure of the wavelet packet transform becomes same as that of a wavelet transform or until all pseudo-subbands in an image are built up.

12. A method for relocating wavelet packet coefficients, comprising:
    (a) transforming image data into the wavelet packet coefficients by filtering and subsampling the image data;

(b) collecting the wavelet packet coefficients in same locations of each subband that is in an integrated frequency band; and (c) relocating the wavelet packet coefficients on the integrated frequency band so as to produce a tree structure to be zerotree coded.

13. The method as claimed in claim 12, wherein, in a tree structure, a parent coefficient has the wavelet packet coefficients corresponding to a same location as children.

14. The method as claimed in claim 12, wherein said step (c) includes the step of relocating the wavelet packet coefficients by assembling a specific number of the wavelet packet coefficients, corresponding to a same location, as a unit.

15. The method as claimed in claim 12, further comprising a coding process, and when a wavelet packet coefficient of a parent frequency band and the wavelet packet coefficients of child frequency bands are zero, all of the wavelet packet coefficients are transmitted in one symbol.

16. The method as claimed in claim 15, further comprising an image data transmission process in which a non-zero coefficient is transmitted after being quantized.

17. The method as claimed in claim 12, wherein, in a portion of a tree structure, a parent coefficient has wavelet packet coefficients corresponding to the same location as children when the relocated wavelet packet coefficients are assembled in the tree structure.

18. The method as claimed in claim 17, wherein the wavelet packet coefficients are obtained by the wavelet packet transform.

19. The method as claimed in claim 18, wherein the portion of the tree structure is determined by characteristics of the image data.

20. The method as claimed in claim 19, wherein the characteristics of the image data are a correlation either between the wavelet packet coefficients and their locations, or, between the wavelet packet coefficients and their frequencies.

* * * * *